(12) United States Patent
Waldmann et al.

(10) Patent No.: US 7,860,610 B2
(45) Date of Patent: Dec. 28, 2010

(54) HANDLING DEVICE

(75) Inventors: Dieter Waldmann, Ebersbach (DE);
Thomas Feyrer, Esslingen (DE);
Michael Freund, Adelberg (DE);
Jürgen Heinzl, Wernau (DE)

(73) Assignee: Festo AG & Co. KG, Esslingen (DE)

( * ) Notice: Subject to any disclaimer, the term of this patent is extended or adjusted under 35 U.S.C. 154(b) by 948 days.

(21) Appl. No.: 11/724,614

(22) Filed: Mar. 15, 2007

(65) Prior Publication Data
US 2007/0233320 A1 Oct. 4, 2007

(30) Foreign Application Priority Data
Mar. 28, 2008 (EP) ............................... 06006353.4

(51) Int. Cl.
*G06F 19/00* (2006.01)
(52) U.S. Cl. ..................................... 700/245
(58) Field of Classification Search ................. 700/231, 700/245, 247, 260; 901/2, 8, 47
See application file for complete search history.

(56) References Cited
U.S. PATENT DOCUMENTS
6,783,317 B2 * 8/2004 Claeys ..................... 414/788.1

7,029,046 B2 * 4/2006 Lim ............................ 294/65
2004/0130085 A1 7/2004 Lim
2005/0236054 A1 1/2005 Jung FOREIGN PATENT DOCUMENTS
DE 100 64 974 7/2002
DE 101 28 185 12/2002
FR 2 707 912 1/1995

* cited by examiner

*Primary Examiner*—Kim T Nguyen
(74) *Attorney, Agent, or Firm*—Hoffmann & Baron, LLP

(57) ABSTRACT

A handling device for handling parts and in particular sheet metal bodywork parts, comprises a carrier unit which has a coupling means for coupling to a robot arm of a robot and a plurality of operating modules each having an attachment interface for the attachment of an operating device such as a vacuum gripper or the like, each operating module being provided with adjustment means for setting position of the attachment interface wherein the adjustment means comprise several positioning setting drives controlled by electrical control signals from a control device, such setting drives rendering possible shifting the attachment interface in the x, y and z directions of a Cartesian coordinate system spanning the x, y and z coordinates, the positioning setting drives being so designed that the attachment interface is able to be positioned in the desired target position by motion in the x, y and/or z direction.

17 Claims, 3 Drawing Sheets

HANDLING DEVICE

BACKGROUND OF THE INVENTION

The invention relates to a handling device for handling parts and in particular sheet metal bodywork parts, comprising a carrier unit which has a coupling means for coupling to a robot arm of a robot and a plurality of operating modules each having at least one attachment interface for the attachment of an operating device such as a vacuum gripper or the like, each operating module being provided with adjustment means for setting the position of the attachment interface.

THE PRIOR ART

Such a handling device is for example described in the German patent publication 100 64 974 A1, in which a modular gripper system is described which is composed of support tubes able to be so connected together by connecting means, as for example tube clamps that the support tubes are able to be turned in relation to each other around axes of rotation extending athwart their longitudinal axis. At the end of a module composed of at least two support tubes there is a holding or receiving means in the form of a vacuum gripper or the like. The position of the holding or receiving means may be reset by pivoting the support tubes within their respective range of pivoting so that the gripper system is able to be adapted by setting the position of the holding and receiving means to suit parts of different types.

The adjustment of the position is however slow in the case of this prior art device owing to the support tubes, which are pivotally connected together by way of the connecting means so that for repositioning the holding and receiving means the procedure is substantially retarded. Furthermore position setting or adjustment depends on the pivot angle of the support tubes and it is not every position which may be set.

SHORT SUMMARY OF THE INVENTION

One object of the invention is to create a handling device of the type initially mentioned which has a high degree of flexibility for handling parts of different sorts.

This aim is to be achieved by handling device with the features of the independent claim 1 herein. Further developments of the invention are indicated in the further claims.

The handling device in accordance with the invention for handling parts and more especially sheet metal bodywork elements, is characterized in that the adjustment means comprise several positioning setting drives controlled by electrical control signals from a control device, such setting drives rendering possible shifting the attachment interface in the x, y and z directions of a Cartesian coordinate system spanning the x, y and z coordinates, the positioning setting drives being so designed that the attachment interface is able to be positioned in the desired target position by motion in the x, y and/or z direction.

Using the positioning setting drives an "automatic" repositioning of the attachment interface and accordingly of the operating devices to be attached thereto, by means of predetermined control instructions, is possible. The attachment interfaces may therefore for instance be shifted into the desired new target position within a few seconds so that for example repositioning is possible between two stroke parts without the operations being retarded. Furthermore, for each attachment interface there is a cube-like positioning range defined by the x, y and z coordinates, within which the attachment interface may be shifted into any desired position. The positioning range is only delimited by the setting reach or range of the positioning setting drives.

The positioning setting drives can be actuated independently of each other, and more especially controlled independently of one another so that the attachment interfaces of a respective operating module is able to be positioned independently of the attachment interfaces of other operating modules of the handling device to the desired target position.

In a particularly preferred manner the positioning setting drives of a respective operating module comprise setting elements able to be shifted independently of each other, which on the one hand are coupled by means of coupling means with a drive unit and on the other hand possess an output or tapping interface for the output of the setting element movement in the x, y or z direction or possess the attachment interface.

In a particularly preferred fashion each operating module possesses a first positioning setting drive and a second positioning setting drive with first and, respectively, second setting elements for movement in the xy, xz or yz plane and a third positioning setting drive for movement in the z, y or x direction, with the proviso that the carrier unit is located in a horizontal position. It is naturally possible as well for the carrier unit to assume a vertical position, and in this case the first and the second setting elements for the movement in the zx or zy plane and the third positioning setting drive are provided for movement in the x or, respectively, y direction.

Preferably the first and the second setting elements are able to be shifted in the same spatial direction independently of each other, their tapping interfaces being coupled by way of a coupling bridge to produce a movement in a direction in space directed perpendicularly to the setting element movement of the first and, respectively, second setting element. A movement of the attachment interface, for example in the y direction, may be achieved thereby by a movement of the first and second setting elements in the x direction. As an alternative it is possible to provide three setting elements, of which a first one can travel in the x direction a second one can travel in the y direction and a third one can travel in the z direction.

In order for the repositioning of the attachment interfaces to be implemented in a reliable fashion, for example by means of control by a signal assigned to a particular setting path, each setting element may be assigned a starting position lying on its travel path, such position being termed the "home position". As from this starting position the desired target position of the attachment interface is then approached. The starting position may be associated with position detecting means for detecting when the setting element moves past it. The position detecting means are for example in the form of position sensors and in particular proximity switches.

In a particularly preferred manner the positioning setting drives are constituted by motor driven linear drives. However pneumatic or hydraulic linear drives may also be employed. In a particularly preferred manner the motor-powered linear drives are constituted by lead screw drives having in each case a coupling means in the form of a lead screw, which on the one hand is able to be driven by a drive unit in the form of a lead screw motor acting by way of drive means and on the other hand having the setting element linearly running on it. It is also possible to utilize linear direct drives as well. As an alternative to a lead screw drive a toothed belt drive may be employed as an example.

In the case of a further development of the invention the attachment point of each operating module is provided with a rotary drive so that the attachment interface may be pivoted, for example about a pivot extending substantially perpendicularly to the interface plane spanned by the attachment interface. Accordingly it becomes possible to swivel the operating device attached to the attachment interface.

To render it possible for the handling device also to be employed in a welding environment, for example adjacent to welding robots, positioning setting elements may be provided with protective covers as a guard against splashed material during welding. The protective coverings may be weld splash resistant sheet metal shields and/or metal brushes. The weld splash resistant sheet metal elements are more particularly suitable for covering large areas of the positioning setting drive, whereas the metal brushes are suitable, owing to their flexibility of their hairs, for covering those positions past which the moving parts travel.

In the case of a further development of the invention the handling device possesses at least one control device for the positioning setting drives using electrical control signals. The control device may be provided on the carrier unit or may be arranged externally, and in the latter case the transmission of signals can be wireless, for example by radio, or optical. It is possible as well for the control device to be arranged on the robot arm and/or it is also possible for the robot control to serve for control of the positioning setting drives.

Further advantageous developments and convenient forms of the invention will be understood from the following detailed descriptive disclosure of one preferred embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
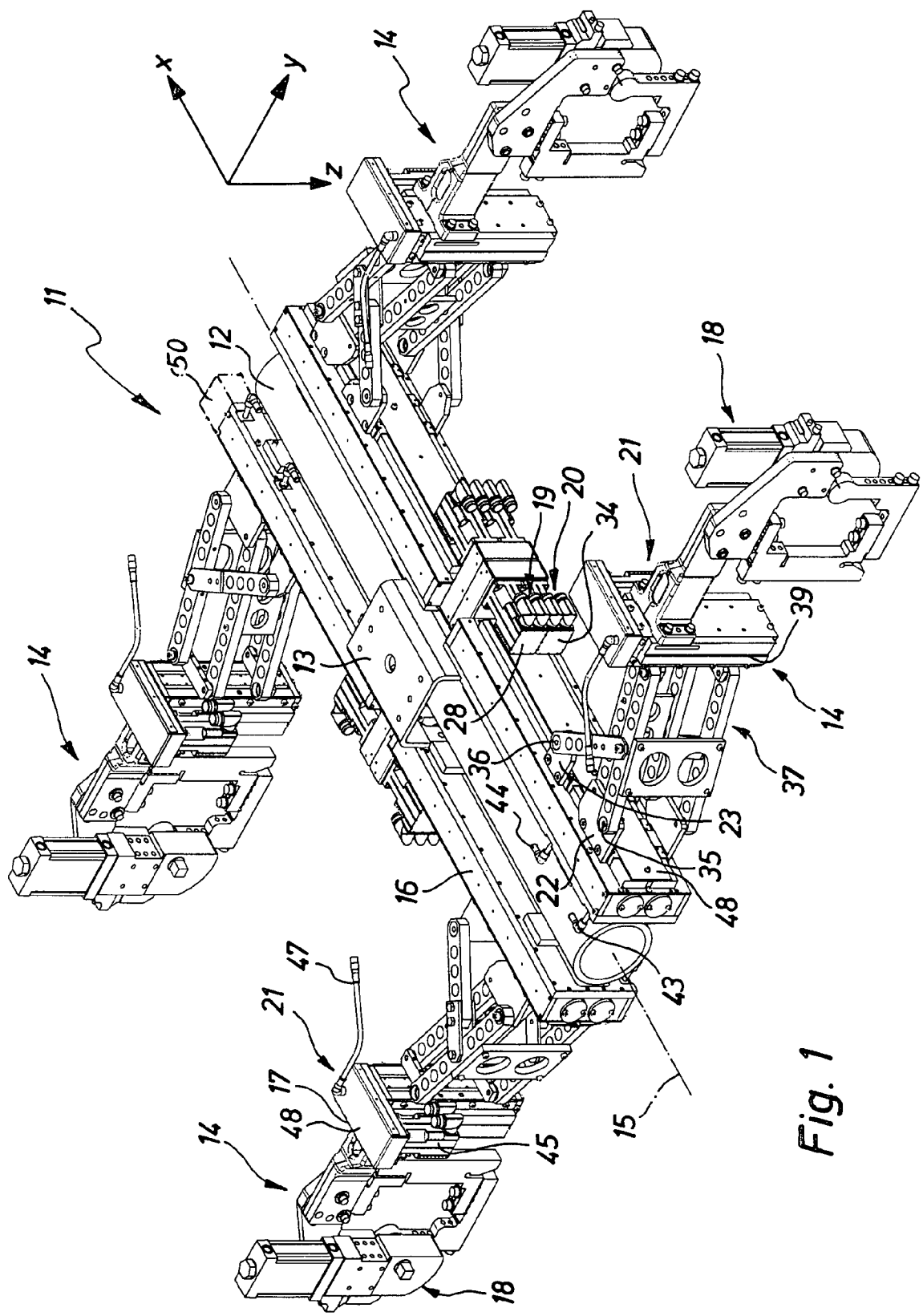
FIG. 1 is a perpendicular representation of a preferred working example of the handling device in accordance with the invention.

FIG. 1 shows a preferred working example of the handling device 11 of the invention. Such a handling device 11 is used more particularly in connection with the handling of parts, more particularly sheet metal bodywork parts. The handling device 11 is frequently termed a vacuum lifting array. It possesses a carrier unit 12, which in FIG. 1 is illustrated as having a cylindrical configuration. The carrier unit 12 possesses a coupling point 13 for coupling on a robot arm of a robot (not illustrated). The coupling point may for example be constituted by an adapter plate 13, arranged on the top side of the carrier unit 12. Owing to the coupling to robot arm it will be apparent that the handling device 11 may be bodily moved into different operating positions in relation to the parts to be lifted. As a rule the carrier unit is horizontally aligned in order for example to lift horizontally placed bodywork sheet metal elements. On the carrier unit 12 several operating modules 14 are attached which could also be termed vacuum pads or feet. In the example of FIG. 1 four operating modules 14 are provided on the carrier unit 12. However, it could mount two or six operating modules 12. Furthermore the mounting of three or more than six operating modules is possible. However the arrangement with bilateral symmetry about the longitudinal axis 15 of the carrier unit of equal numbers of operating modules has been found to be practical.

The following description is limited for the sake of simplification to a single operating module 14. The remaining operating modules 14 are essentially identical in construction.

Figure 2:
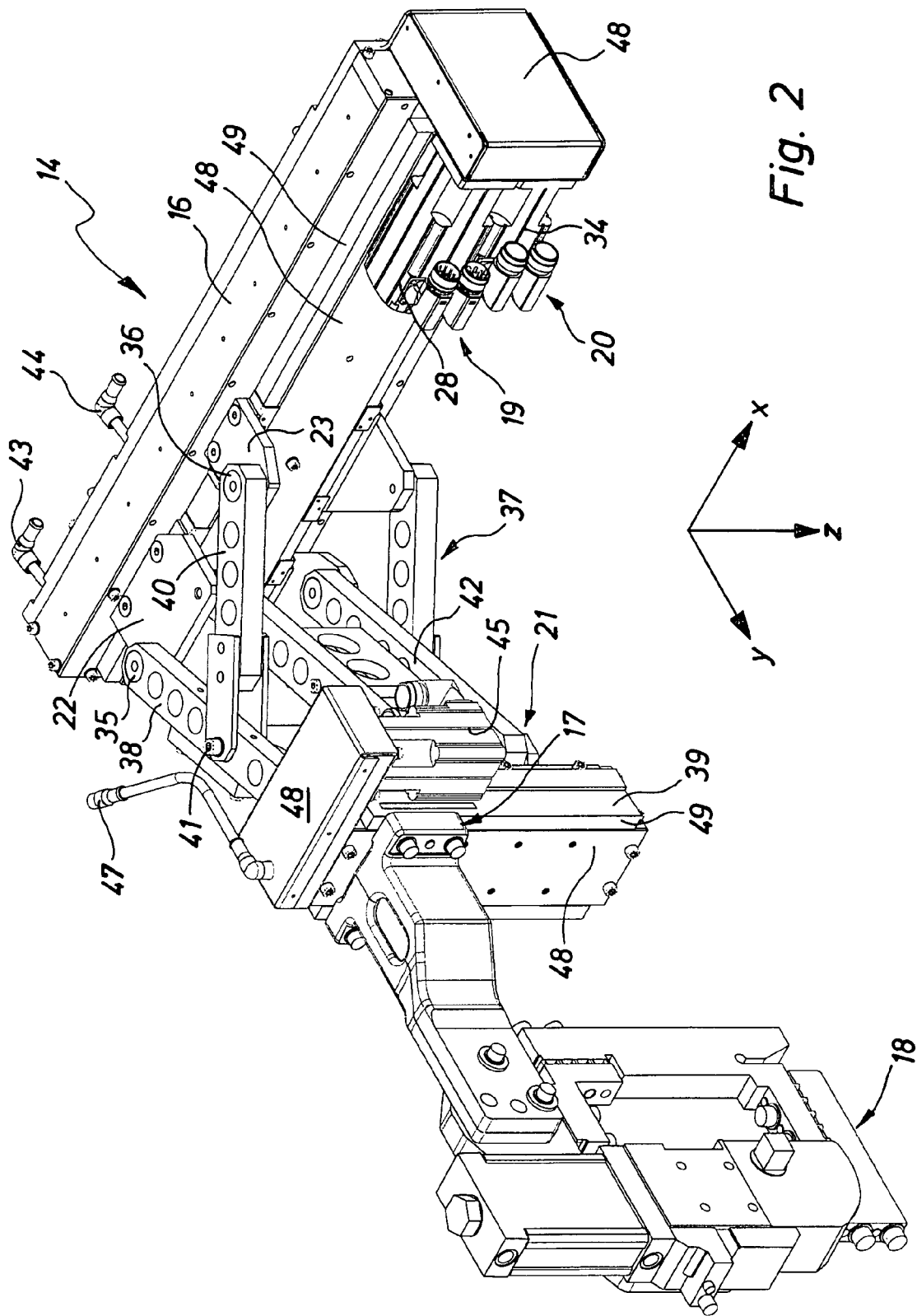
FIG. 2 is a representation on a larger scale of a single operating module of the handling device as in FIG. 1.

The operating module 14 is attached to the carrier unit using a box-like module housing 16. As more particularly indicated in FIG. 2, the operating module 14 possesses an attachment interface 17 for the attachment of an operating device 18. As operating devices 18 it may for example be a question of vacuum pads or grippers, motor driven gripping elements, indexing pins or the like. Furthermore the operating module 14 exhibits adjustment means for setting the position of the attachment interface 17, such adjustment means comprising a plurality of positioning setting drives 19, 20 and 21 able to be controlled by electrical control instructions originating from, for example, a control device 50 arranged on the carrier unit 12. The positioning setting drives 19, 20 and 21 render possible shifting the attachment interface in the x, y and z directions of a Cartesian coordinate system spanned by x, y and z coordinates. Moreover the positioning setting drive 19, 20 and 21 are so designed that the attachment interface 17 is able to be positioned by movements in the x, y and/or z direction to reach the desired target position. The positioning setting drives are in the form of motor driven linear drives 19, 10 and 21 and each possess a setting element 22, 23 and 24 which on the one hand is coupled by way of coupling means with a drive unit and on the other hand possesses a tapping interface for tapping the setting element movement in the x, y or z direction or possesses the attachment interface 17.

Figure 3:
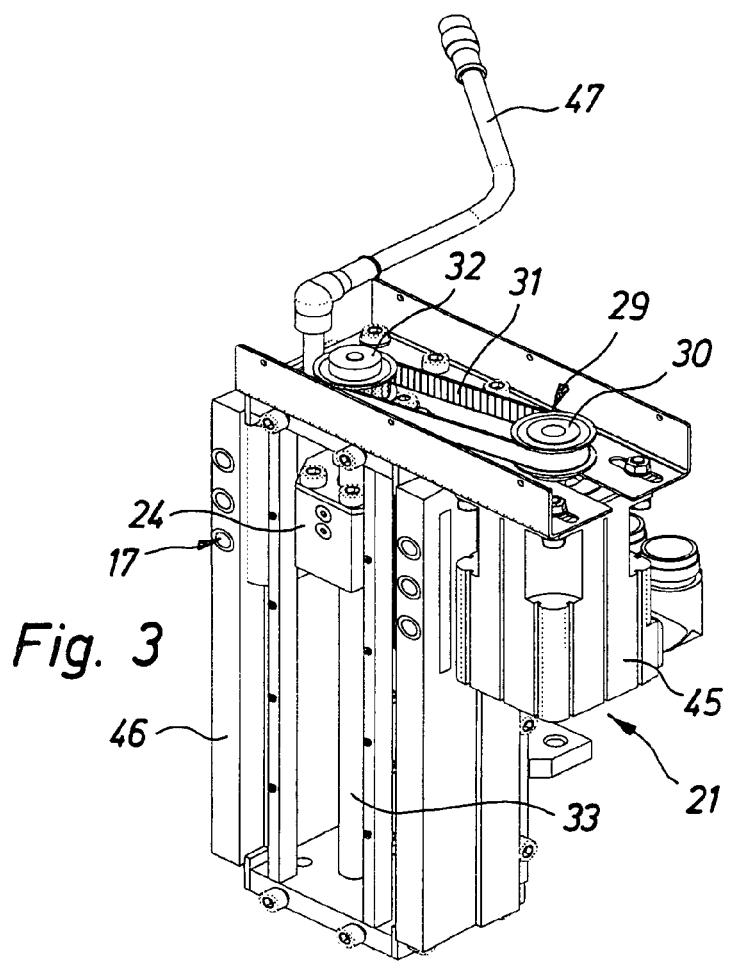
FIG. 3 is a perspective and partially sectioned representation of the positioning setting drive provided with the attachment interface.

As a motor driven linear drive more particularly lead screw drives 19, 20 and 21 are suitable. There is therefore a first lead screw drive 19, which is seated on and in the module housing 16. The first lead screw drive 19 has a lead screw (not illustrated), which extends along the longitudinal carrier axis 15 and accordingly serves for travel in the x direction, provided that the carrier unit 12 is located in a horizontal position. The lead screw is driven by a lead screw motor 28, for example in the form of a belt drive 29 (FIG. 3). The first lead screw motor 28 is mounted on the outside of the module housing 16 intermediate the ends of the carrier unit 12. As more especially illustrated in FIG. 3 the belt drive 29 has a first belt pulley 30, which is driven to rotate by a drive shaft of the lead screw motor. The first belt pulley 30 is connected by way of a belt 31 with a second belt pulley 32, which for its part is keyed on the lead screw 33 (FIG. 3). On the lead screw (not illustrated) of the first lead screw drive 19 a first setting element in the form of a guide slide 22 runs for linear motion. The guide slide 22 furthermore runs linearly along a guide rail extending along the setting lead screw.

Furthermore a second setting drive 20 is provided which is also mounted in and on the module housing 16. The setting lead screw (not illustrated) of the second lead screw drive 20 is also accommodated in the module housing 16 and extends along the longitudinal carrier axis 15 and furthermore it is parallel to the setting lead screw of the first lead screw drive 19. A second lead screw motor 34 is provided arranged on the top or bottom side of the module housing 16 and accordingly is seated in the middle of the carrier unit 12. For driving a belt drive is again provided, which is identical in design to the belt drive of the first lead screw drive 19. On the setting lead screw of the second lead screw drive 20 a second setting element in the form of a second guide slide 33 is able to move linearly. The second guide slide 23 furthermore runs linearly on a guide rail. For guiding the guide slides 22 and 23 a linear ball guide and for example a ball with circulating cage-held balls may be used. It is naturally possible for other guide designs to be employed.

The two guide slides 22 and 23 respectively possess a tapping point or interface in the form of a first and a second pivot 35 and 36 which are connected by way of a coupling bridge in the form of a parallelogram linkage 37 with each other. The parallelogram linkage 37 possesses a first link lever 38 is pivoted at one end by way of the pivot 35 with the first guide slide 22 and at the other end on the housing 39 of the third positioning setting drive 21. Furthermore there is a second pivot lever 40 which at one end is pivotally connected by way of the second pivot 36 pivotally with the second guide slide 23 and at the other end by way of a pivot 41 on the first pivot lever 38. Furthermore parallel to the first pivot lever 38 a support lever 42 is provided, which at one end is pivotally connected with the first guide slide 22 and at the other end is pivotally connected with the module housing 39 of the third positioning setting drive 21.

Furthermore position detecting means in the form of proximity switches 43 and 44 are mounted on the module housing 16, of which the first proximity switch 43 is placed on the path of travel of the first guide slide and the second proximity switch 44 is placed on the path of travel of the second guide slide. The proximity switches 43 and 44 are assigned to a starting position or a home position of the first and of the second guide slide 22 and 23, the proximity switches 43 and 44 being responsive to movement past the starting position.

Figure 4:
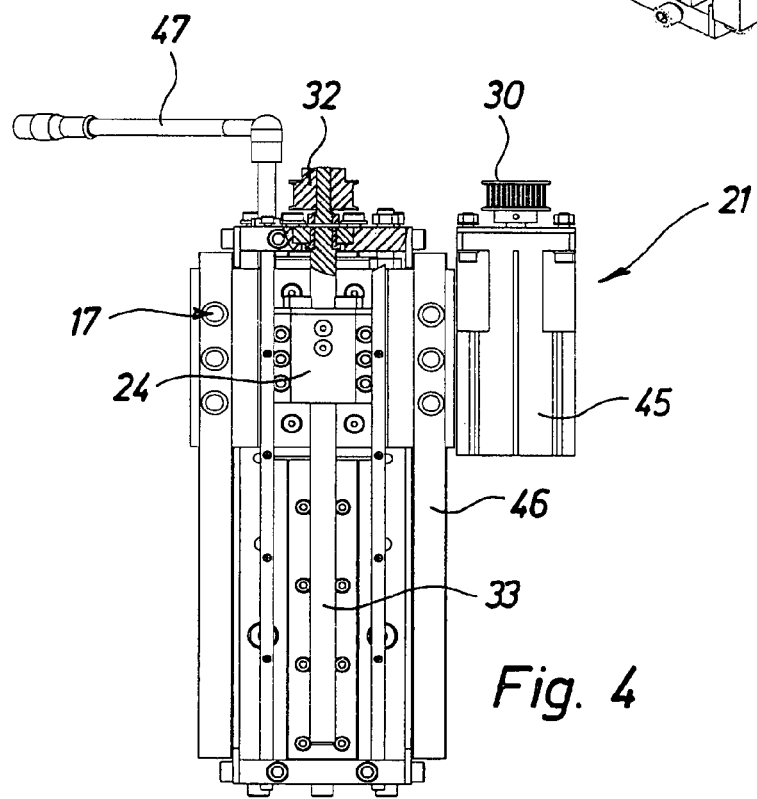
FIG. 4 is a partly sectioned side elevation of the positioning setting drive as in FIG. 3.

Furthermore the there is a third lead screw drive 21, which is seated on the end of the parallelogram linkage 37 remote from the carrier unit and therefore able to be moved bodily by the movement of the parallelogram linkage 37. The third lead screw drive 21 possesses a housing 39, in which a lead screw 33 is supported for rotation essentially perpendicular to the longitudinal axis 15 of the carrier. As more especially depicted in FIGS. 3 and 4 the lead screw 33 is driven-by a third lead screw motor 45 via a belt drive 29. The belt drive is essentially identical to the belt drives of the first and second lead screw drives 19 and 20. Mounted on the lead screw 33 there is again a setting element in the form of a linearly moving guide slide 34, such slide being for its part guided for linear motion on a guide rail aligned parallel to the setting lead screw 33 in addition. The third guide slide 24 is furthermore provided with a U-like docking part 46, on whose front side the attachment interface 17 is located. In this case as well a proximity switch 47 is placed on the path of travel of the third guide slide, to wit at a position assigned to the starting position of the guide slide 23.

In the case of an alternative design, not illustrated, a superstructure is placed with a rotary drive, as for example in the form of a pivoting vane drive. The attachment interface is then located on the superstructure and may be pivoted by means of the rotary drive. For instance, a pivoting movement is possible about a pivot axis perpendicular to the pivot axis placed perpendicularly to the interface plane spanned or defined by the attachment interface. Accordingly it is consequently possible to tap a further pivoting movement at the attachment interface in addition. It is for instance possible to provide a pivot drive module which on the one hand is attached to the docking part and on the other hand bears the pivotal attachment interface.

In the case of an alternative working example, not illustrated, of the handling device of the invention instead of the lead screw drives belt drives are utilized, the guide slides being provided if desired, which are in this case guided on the toothed belt.

The handling device 11 is, as mentioned, preferably used for handling sheet metal bodywork elements. For instance the bodywork elements of sheet metal may be repositioned by means of the handling device 11 from a welding station to the following, next welding station. There is accordingly a need for being able to use the positioning setting drive, and more particularly the lead screw drives 19, 20 and 21 in such a welding environment as well.

Accordingly it is necessary to guard the positioning setting drives, and more particularly the lead screw drives 19, 29 and 21, using suitable coverings 48 against splashed welding material. For such protective covering with a large area welding material splash resistant sheet metal elements 48 and employed. In order to attain resistance to weld material splashing such sheet metal elements may in the case of steel sheet have a burnished surface, for example with an oil coating so that splashed weld material will pearl off. In the case of aluminum sheet an anodized or powder coating may produce the same effect. As shown in FIGS. 1 through 4, such sheet metal elements 48 are more particularly provide on the front side of the module housing of the third lead screw drive 23 for covering the belt drive. Since both on the module housing 16 and also on the housing 39 there are moving parts, which extend out of the housings, complete encapsulation not possible. Accordingly for the protective covering adjacent to the moving parts metal brushes 49, for example brass ones, are provided, over which the moving parts, for example the guide slides 22 and 23 of the docking part, may travel.

To adjust the desired target position of the attachment interface 17 of a respective operating module 14 the guide slides 22, 23 and 24 of the lead screw drives 19, 20 and 21 are initially shifted into their starting positions. This starting position is then detected by means of the proximity switches 43 and 44 and transmitted to the control device by way of a control signal.

Then each lead screw 19, 20 and 21 within a operating module 14 is started and controlled and using a control signal and certain setting path is predetermined. The lead screw motors 28, 34 and 45 are activated so that the guide slides 22, 23 and 24 may be shifted to the desired set position using the setting lead screws. When such setting positions have been reached the lead screw motors are turned off and the guide slides are fixed stationarily in this position, i.e. a movement out of the set position is not possible without movement in the lead screw. The system is "self locking" in design, as it were.

As regards details with the carrier unit 12 in the horizontal position the first and the second guide slides 22 and 23 are shifted in the same direction for travel of the attachment interface 17 in the x direction for the same distance. Accordingly only a movement of the attachment interface 17 is produced in the x direction, whereas a movement in the y direction does not take place. If now a movement in the x and y directions, i. e. in the xy plane, the first and the second guide slides 22 and 23 are shifted through different distances along the respective setting paths. If merely a movement in the y direction is to be produced, then both the guide slides 22 and 23 are shifted for the same distance along the setting path toward or away from the each other. The motion in the y direction is therefore produced using the parallelogram linkage 37, at whose end the third lead screw drive 21 is mounted. The guide slides 24 of the third lead screw 21 can be shifted independently from the other two guide slides 22 and 23 into the desired z position. All in all such movements may be implemented by all operating modules of the handling device 11, if needed separately from one another so that the attachment interfaces 11 may be shifted independently from one another into the respective target position.

The invention claimed is:

1. A handling device for handling parts and in particular sheet metal bodywork parts, comprising a carrier unit which has a coupling means for coupling to a robot arm of a robot and a plurality of operating modules each having at least one attachment interface for an attachment of an operating device, each operating module being provided with adjustment means for setting a position of the attachment interface wherein the adjustment means comprise several positioning setting drives controlled by electrical control signals from a control device, such setting drives rendering possible shifting the attachment interface in the x, y and z directions of a cartesian coordinate system spanning the x, y and z coordinates, the positioning setting drives being so designed that the attachment interface is able to be positioned in a desired target position by motion in at least one of the x, y or direction, and wherein the positioning setting drives of each operating module are so designed that the attachment interface of a respective operating module may be positioned independently from the attachment interfaces of the other operating modules to the desired target position.

2. The handling device as set forth in claim 1, wherein the positioning setting drives of each respective operating module possess setting elements, which are shiftable individually, such elements being on the one hand coupled with a drive unit by coupling means and on the other hand having a tapping interface for tapping a setting element movement in the x, y or z direction or the attachment interface.

3. The handling device as set forth in claim 2, wherein each operating module exhibits a first positioning setting drive and a second positioning setting drive with first and, respectively, second setting elements for shifting in the xy, xz or yz plane in the case of a horizontal position of the carrier unit and a third positioning setting drive for shifting in the z direction or, respectively, in the y direction or, respectively, in the x direction in the case of a horizontal position of the carrier unit.

4. The handling device as set forth in claim 3, wherein the first and the second setting elements are able to be shifted in the same direction in space independently of each other, their tapping interfaces being coupled by way of a coupling bridge with each other to produce a movement in a direction in space perpendicular to the movement of the second setting element.

5. The handling device as set forth in claim 4, wherein as a coupling bridge a parallelogram linkage is provided.

6. The handling device as set forth in claim 2, wherein each setting element has assigned to it a starting position lying on its path of travel, position detecting means for the detection of travel of the setting element past the starting position being assigned to the said starting position.

7. The handling device as set forth in claim 6, wherein the position detecting means are in the form of position sensors, and in particular proximity switches.

8. The handling device as set forth in claim 2, wherein the setting elements are in the form of guide slides traveling linearly on an associated guide rail.

9. The handling device as set forth in claim 1, wherein the positioning setting drives are in the form of driven linear drives.

10. The handling device as set forth in claim 9, wherein said motor driven linear drives are constituted by lead screw drives each having coupling means in the form of a lead screw, which on the one hand is able to be driven via transmission means by a drive unit in the form of a lead screw motor and on which on the other hand the setting element runs linearly.

11. The handling device as set forth in claim 10, comprising a belt drive as said drive means.

12. The handling device as set forth in claim 1, wherein the positioning setting drives are provided with guard coverings for protection against splashed welding material.

13. The handling device as set forth in claim 12, wherein the guard coverings are constituted by sheet metal elements and/or metal brushes resistant to splashed welding material.

14. The handling device as set forth in claim 13, wherein the said sheet metal elements resistant to splashed welding material include burnished steel sheet and/or powder coated or anodized aluminum sheet.

15. The handling device as set forth in claim 1, wherein the attachment interface of each operating module is provided with a rotary drive for pivoting the attachment interface, preferably about a pivot extending essentially perpendicularly to the interface plane spanned by the attachment interface.

16. The handling device as set forth in claim 1, comprising at least one control device for control of the positioning setting drive.

17. The handling device as set forth in claim 1, comprising at least one control device on the carrier unit.

* * * * *